(12) United States Patent
Bopp et al.

(10) Patent No.: US 7,670,545 B2
(45) Date of Patent: Mar. 2, 2010

(54) METHOD FOR PRODUCING SEMICRYSTALLINE POLYLACTIC ACID ARTICLES

(75) Inventors: Richard C. Bopp, Golden Valley, MN (US); Jason Whelan, New Hope, MN (US)

(73) Assignee: NatureWorks LLC, Minnetonka, MN (US)

( * ) Notice: Subject to any disclaimer, the term of this patent is extended or adjusted under 35 U.S.C. 154(b) by 0 days.

(21) Appl. No.: 12/163,466

(22) Filed: Jun. 27, 2008

(65) Prior Publication Data

US 2008/0258357 A1 Oct. 23, 2008

Related U.S. Application Data

(63) Continuation of application No. 10/223,451, filed on Aug. 19, 2002, now abandoned.

(51) Int. Cl.
*B29C 43/10* (2006.01)
(52) U.S. Cl. ........................ 264/571; 264/319; 264/320; 264/322
(58) Field of Classification Search ........................ None
See application file for complete search history.

(56) References Cited

U.S. PATENT DOCUMENTS

| | | | |
|---|---|---|---|
| 4,719,246 A | 1/1988 | Murdoch | |
| 5,498,650 A | 3/1996 | Flexman et al. | |
| 5,766,748 A | 6/1998 | Ikado et al. | |
| 5,922,832 A | 7/1999 | Randall | |
| 5,981,619 A | 11/1999 | Shikinami | |
| 6,005,068 A | 12/1999 | Gruber | |
| 6,093,791 A | 7/2000 | Gruber | |
| 6,136,905 A | 10/2000 | Suzuki et al. | |
| 6,248,430 B1 | 6/2001 | Toyoda | |
| 6,290,896 B1 | 9/2001 | Suzuki | |
| 6,506,873 B1 | 1/2003 | Ryan | |
| 6,652,983 B1 | 11/2003 | Mori | |
| 6,669,771 B2 | 12/2003 | Tokiwa | |

FOREIGN PATENT DOCUMENTS

| | | |
|---|---|---|
| DE | 198 29 936 A | 1/2000 |
| EP | 585747 A | 3/1994 |
| EP | 1247840 A | 10/2002 |

*Primary Examiner*—Monica A Huson
(74) *Attorney, Agent, or Firm*—Gary C. Cohn PLLC

(57) ABSTRACT

Amorphous sheets of PLA resins are thermoformed by heating the sheets until they become semicrystalline, and then forming the sheets on a relatively cold mold. Semicrystalline formed articles having improved heat resistance are made by the process.

22 Claims, No Drawings

METHOD FOR PRODUCING SEMICRYSTALLINE POLYLACTIC ACID ARTICLES

CROSS-REFERENCE TO RELATED APPLICATION

This application is a continuation of application Ser. No. 10/223,451, filed 19 Aug. 2002 now abandoned.

BACKGROUND OF THE INVENTION

The present invention relates to methods for forming heat-resistant, semicrystalline articles from polylactic acid.

Polylactic acid (PLA) is useful for making films, fibers, and various types of formed articles. One limitation on its use in some food packaging and other applications is its tendency to deform when heated. For example, many food packaging applications require the resin to be subjected to the temperature of boiling water without significant deformation. PLA articles often cannot withstand such temperatures.

PLA tends to exist in an amorphous state when formed into these kinds of articles. Experience with a more conventional resin, poly(ethylene terephthalate) (PET) has shown that better resistance to heat can be obtained if the polymer has a greater amount of crystallinity. For PET, this has resulted in a specialized thermoforming process for inducing crystallinity into PET articles. In cPET thermoforming, a PET sheet is heated until soft enough to be formed, then transferred to a hot mold and formed under vacuum and pressure. The temperature and residence time in the mold are such that crystallites form in the resin. Once the needed crystallinity is obtained, the article is transferred into another mold of identical dimensions. This second mold is held below the glass transition temperature ($T_g$) of the PET resin, usually near room temperature. The colder temperatures "quench" the resin, "locking in" the as-formed dimensions. If the resulting PET resin is sufficiently crystalline, it may withstand use temperatures some 20-150 C higher or more than amorphous PET.

The PET thermoforming process has the drawbacks of requiring two molds, which increases capital investment and operating costs, and long forming times in the mold to allow crystallization to be completed, which reduces output per unit time and thus increases costs.

As mentioned, the cPET thermoforming process is a material-specific one that is designed around the particular characteristics of PET resin.

It has been recognized that PLA, like PET, can be formed into a more crystalline state by subjecting it to certain temperatures. See Kolstad, "Crystallization Kinetics of Poly(L-lactide-co-meso-lactide)", *J. Applied Polymer Science* 62, 1079-1091 (1996). As described by Kolstad, the rate of crystallization is affected by various factors, including the lactic acid enantiomer ratio, the use of nucleating agents, and the thermal history of the polymer (i.e. time at crystallization temperature and/or cooling rates).

Nonetheless, no cost-effective commercial process has been developed for making formed crystalline PLA articles. It would be desirable to provide such a process, as it would permit PLA to be used in end-use applications that require improved heat resistance.

SUMMARY OF THE INVENTION

In one aspect, this invention is a method for making formed heat-resistant PLA articles, comprising heating a sheet of an amorphous, crystallizable PLA resin until the sheet has obtained a surface temperature from about 80 to about 155° C., then thermoforming the heated sheet on a mold that is at a temperature below 80° C.

In a second aspect, this invention is a method for making formed heat-resistant PLA articles, comprising heating a sheet of a semicrystalline PLA resin having a crystallinity of at least 10 Joules/gram to a temperature at which the sheet can be thermoformed but at which the crystallinity of the sheet is not reduced below 10 Joules/gram, and then thermoforming the sheet on a mold that is at a temperature below 80° C. to produce a formed article of PLA resin having a crystallinity of at least 10 Joules/gram.

In another aspect, this invention is a method for making formed heat-resistant PLA articles, comprising heating a sheet of an amorphous, crystallizable PLA resin to a temperature at which the PLA resin forms crystallites and for a time sufficient to impart a crystallinity of at least 10 Joules/gram to the PLA resin, and then thermoforming the heated sheet on a mold that is at a temperature below 80° C. to produce a formed article of PLA resin with a crystallinity of at least 10 Joules/gram.

This invention provides a simple, efficient method for making formed articles with improved heat resistance from crystallizable PLA resin. Cycle times as short as about 3 seconds or even less for the forming step can be achieved with this method using commercial-scale equipment. Because only a single mold is necessary, capital expense and operating expenses are minimized. The crystallinity of the PLA resin can be controlled over a wide range by adjusting time and temperature during the heating step, and through control of the composition of the PLA resin itself, as described more below. As certain properties of the PLA resin (notably heat resistance) vary with the crystallinity, this process provides a method whereby easy control over those properties can be obtained. In particular, this invention provides a rapid and inexpensive process for making formed PLA articles that can resist exposure to temperatures of 100° C. or more with minimal or no distortion. This permits the articles to be used in a variety of applications, in particular food packaging, in which the article and its contents are to be heated.

DETAILED DESCRIPTION OF THE INVENTION

In this invention, a semicrystalline sheet of PLA resin is thermoformed on a mold that is at a temperature of 80° C. or less. The semicrystalline sheet of PLA resin is obtained by heating a sheet of amorphous PLA resin to a specific temperature range until the desired crystallinity is obtained. The resulting semicrystalline sheet can be immediately thermoformed, or else cooled and later reheated to a thermoforming temperature under conditions that the crystallinity is maintained and then thermoformed.

In the preferred process, the heating step is performed as part of the overall thermoforming process. In the first step of the preferred process, a sheet of amorphous but crystallizable PLA resin is heated. The function of the heating is two-fold—to soften the sheet so that it can be formed in the subsequent step, and to introduce crystallinity into the PLA resin. The conditions of the heating are selected to achieve these purposes.

Softening is performed such that the sheet can be thermoformed under commercially reasonable conditions, without softening the sheet so much that it is too fluid to transfer to the thermoforming mold and be formed into a part.

Crystallinity is introduced such that the sheet develops a crystallinity during the heating step of at least 10 Joules/gram, preferably at least 15 Joules/gram, more preferably at least 20

Joules/gram, even more preferably at least 24 Joules/gram, to about 55 Joules/gram, preferably to about 45 Joules/gram, even more preferably to about 40 Joules/gram.

Crystallizable PLA resins are those that will form crystallites rapidly when a sheet of the resin is heated to a sheet surface temperature range which lies above the $T_g$ but below its melting temperature ($T_m$). The temperature range to which the PLA resin must be heated will be a characteristic of the particular PLA resin, and will depend largely on the lactic acid enantiomer ratio and the presence of nucleating agents and/or plasticizers, as described more fully below. In general, however, the temperature at which the requisite crystallization will occur within commercially reasonable time frames is from about 80° C. to about 160° C. and is more typically from about 90° C. to about 150° C.

Thus, one method of controlling the process of the invention is to monitor sheet surface temperature. Sheet temperature is generally a suitable process control parameter for sheet thicknesses that are typically used in thermoforming applications, such as up to about 250 mil, preferably about 10-100 mil, even more preferably about 15-50 mil, unless extremely rapid heating rates are used. A thicker sheet, or one that is heated very rapidly, may exhibit a significant temperature gradient between the surface and the center. Under these conditions, therefore, surface temperature measurements alone may be less suitable as a process control parameter. For the best results, it is desirable to introduce crystallinity throughout the thickness of the PLA resin, rather than only near the surfaces of the sheet.

It is anticipated that in most cases, heating conditions will be established empirically with respect to the particular equipment and particular PLA sheet that is used. These empirically derived heating conditions may be developed by establishing suitable and/or optimal temperatures to which a particular PLA resin sheet should be heated, and then relating those temperatures to particular controllable processing conditions such as heating time, line speeds, heater and/or oven temperatures, power to be supplied to heating apparatus, and the like. Alternatively, heating conditions can be empirically derived by measuring the crystallinity of the heated PLA sheet while varying process parameters.

The heating step can be carried out in any convenient manner, such as convection heating, radiant heating (using devices of various types such as visible light, infrared radiation, microwave radiation, and the like), conductive heating (such as by passing the sheet over a heated surface or between heated surfaces such as heated rollers) and induction heating. In order to keep cycle times short, heating is preferably done quickly and uniformly without scorching the sheet or forming significant localized hot spots. The sheet is conveniently held in a clamping frame or other apparatus to give it physical support and to facilitate transfer in and out of the heater and/or to the subsequent forming step.

The heating step may also be performed as part of the process of extruding the sheet. In this variation, the PLA resin is first extruded into sheet form. Because extrusion temperatures are generally higher than the melting temperature ($T_m$), it is necessary to cool the sheet in order to reduce the temperature below $T_m$ and into the temperature range at which crystallization occurs. The heating step of this invention can be accomplished by adjusting the temperature of the freshly extruded sheet into the aforementioned temperature ranges, and holding the temperature there until the requisite crystallinity has been developed. The crystallized sheet can then be cooled below the $T_g$, in order to be thermoformed in a separate, later step. In such a case, the sheet will be re-heated to the thermoforming temperature (but not to so high a temperature that crystallinity is destroyed) when the thermoforming process is performed. Alternatively, the crystallized sheet may be fed directly into the thermoforming step.

Following the heating step, the PLA sheet is transferred to a mold and thermoformed. The transfer to the mold is performed so that the PLA sheet remains at a temperature suitable for thermoforming until the transfer is complete and the thermoforming accomplished. The mold is at a temperature below 80° C., preferably below the $T_g$ of the PLA sheet, more preferably no greater than 50° C., and especially no greater than 35° C. Because of the relatively cold mold temperature, the PLA sheet quickly hardens into the desired shape in the mold. Some additional stress-induced crystallinity may be introduced due to the orientation of the polymer during the thermoforming process, but the amount is generally small.

Thermoforming is accomplished by positioning the softened and crystallized sheet over a male or female mold, and drawing and/or pressure forming the sheet on the mold to form a molded part. The mold is most typically a female mold. Multiple formed parts can be made simultaneously or sequentially from a single sheet. Except for the mold temperature, which is held below the temperatures discussed above, the process of this invention can be conducted using conventional types of thermoforming apparatus, which are adapted if necessary to provide a means to maintain the mold at the requisite temperature. Examples of such apparatus and general methods are described, for example, by Throne in "Thermoforming Crystallizing Poly(ethylene Terephthalate) (CPET)", *Advances in Polymer Technology*, Vol. 8, 131-146 (1988). Drawing is performed using vacuum, and is the preferred method. The mold may include a male half that is inserted into the female half during the process to provide male mold forming. It may also be desirable to prestretch the sheet; if so a pressure cap or other prestretching device may be used and actuated prior to drawing the sheet into the mold.

The thermoforming step is preferably operated such that thermoforming cycle time (time to complete one thermoforming cycle and get ready to perform the subsequent cycle) is minimized. Thermoforming cycle times are advantageously less than 20 seconds, preferably less than 10 seconds, more preferably no more than 5 seconds, and even more preferably no more than 3 seconds.

Once the part is formed and cooled below its $T_g$, it is demolded and separated from other parts and trimmed if necessary. Various downstream operations, such as applying graphics or labels, assembly to other parts, packaging and the like can be performed if needed, depending on the type of part and its intended use.

By "PLA sheet", it is meant a sheet of a thermoplastic poly(lactic acid) homopolymer or copolymer containing at least 50% by weight (based on the PLA resin) of repeating units derived from lactic acid. The PLA is more preferably a homopolymer of lactic acid. The PLA resin may be blended with small (up to about 50% by weight, based on the weight of the polymers) of another polymer which is not a PLA, but is preferably not such a blend. The preferred PLA resin is a homopolymer of either L-lactic acid or D-lactic acid, a random copolymer of L-lactic acid and D-lactic acid, a block copolymer of L-lactic acid and D-lactic acid, or a mixture of two or more of these. As discussed below, the ratio of the lactic acid enantiomers and the manner in which they are copolymerized (i.e., randomly, block, multiblock, graft and like) greatly influences the ability of the PLA sheet to crystallize in the present process.

The PLA resin can be formed by polymerizing lactic acid or, preferably, by polymerizing lactide. Thus, the term PLA resin is used herein to include polymers made by polymerizing lactide. Lactide is a dimeric form of lactic acid, in which two lactic acid molecules are condensed to form a cyclic diester. Like lactic acid, lactide similarly exists in a variety of enantiomeric forms, i.e., "L-lactide", which is a dimer of two L-lactic acid molecules, "D-lactide", which is a dimer of two D-lactic acid molecules and "meso-lactide" which is a dimer formed from one L-lactic acid molecule and one D-lactic acid molecule. In addition, 50/50 mixtures of L-lactide and D-lactide that have a melting temperature of about 126° C. are often referred to as "D,L-lactide". Any of these forms of lactide, or mixtures thereof can be copolymerized to form a PEA resin for use in this invention. The L/D ratio in the PLA resin is controlled through the ratio of these enantiomeric forms of lactide that are used in the polymerization. In an especially preferred process mixtures of L-lactide and meso-lactide are polymerized to form a polymer having a controlled level of D-lactic acid enantiomeric units. Suitable processes for polymerizing lactide to form PLA having controlled L/D ratios are described, for example, in U.S. Pat. Nos. 5,142,023 and 5,247,059, both incorporated herein by reference.

The PLA resin may be compounded with various additives and processing aids such as nucleants, other inorganic fillers, plasticizers, reinforcing agents, slip agents, lubricants, UV-stabilizers, thermal stabilizers, flame retardants, foaming agents, antistatic agents, antioxidants, colorants, and the like, with finely divided inorganic solids being of particular importance as discussed more below.

The PLA sheet is amorphous and capable of being crystallized to the extent of 10 Joules/gram through heating at a temperature between its $T_g$ and $T_m$. Preferably, it is capable of being crystallized to a crystallinity of at least 15 Joules/gram, more preferably at least 20 Joules/gram, even more preferably at least 24 Joules/gram, especially at least 30 Joules/gram. For purposes of this invention, a PLA sheet is considered "amorphous" if it exhibits a crystallinity of less than 10 Joules/g when measured by differential scanning calorimetry (DSC) as described more fully below.

The composition of the PLA sheet is also preferably such that the sheet can be crystallized to the desired extent in a short period. Three important parameters affecting this are the ratio of the lactic acid enantiomers in the PLA resin, the use of nucleating agents and the use of plasticizers.

The ability of PLA to crystallize, all other things being equal, is greatest when only one of the lactic acid enantiomeric forms is present in polymerized form in the polymer. Thus, homopolymers of L-lactic acid or D-lactic acid are the forms of PLA that tend to crystallize most completely and rapidly. In random copolymers of the L- and D-enantiomers, the ability to crystallize falls off rapidly as more of the second enantiomer is present. In this invention, it is preferred to use a PLA resin in which the lactic acid enantiomer ratio is at least 90:10, preferably at least 95:5, more preferably at least 98:2, to about 99.9:0.1, more preferably to about 99.5:0.5, even more preferably 99:1. It is unimportant in terms of performance whether the predominant isomer is the L- or D-form. PLA resins having predominantly the L-isomer are more readily available commercially, and are preferred for that reason.

The proportion of "D" and "L" lactic acid repeating units in enantiomeric polylactic acid (PLA) copolymers can be accomplished by high performance liquid chromatography. A suitable chromatograph is a Waters LC Module I HPLC with a Sumichiral OA6100 column set and a Model 486 variable wavelength UV detector. Prior to analysis, the PLA enantiomeric copolymer is fully hydrolyzed in a basic aqueous solution into its constituent D- and L-lactic acid monomer units. Enantiomer ratio is conveniently determined by neutralizing the solution with 1N HCl and injecting it into the HPLC through a 0.45 micron filter. The concentration of the lactic acid enantiomers is determined by comparison of the HPLC results to standard curves generated using pure standards such as are supplied by the Aldrich and Sigma Chemical Companies.

The PLA resin may be compounded with a nucleating agent in order to improve its ability to crystallize quickly. Suitable nucleating agents include finely divided solids that do not react under the conditions of the heating step or the thermoforming process. Particles having a median particle size of less than 5 µm, preferably less than 1 µm, are particularly suitable. The most preferred nucleating agent is talc, as it often provides a measure of reinforcement in addition to performing the nucleation function well. Among the suitable commercially available talc products are Ultratalc™ 609, available from Specialty Minerals, Inc., and Zemex HTP Ultra SC™, available from Zemex Fabi Benwood LLC. Nucleating agents are used in effective amounts, but if used in too large quantities they can cause the physical properties of the PLA resin to deteriorate. Preferred amounts for most nucleating agents are from about 0.1, preferably from about 0.5 to about 10, preferably to about 5, more preferably to about 2.5 percent of the combined weight of the PLA resin and the nucleating agent. In the case of talc, it may be desirable to employ larger quantities in order to obtain a desirable reinforcement effect. Thus, preferred usage levels for talc are from about 0.5, more preferably from about 3, even more preferably from about 5 to about 40, more preferably to about 30 and even more preferably to about 20 percent of the combined weight of the PLA resin and the talc.

Nucleating agents are conveniently melt compounded into the PLA resin using any suitable melt compounding equipment, such as single and twin screw extruders, roll mills, Banbury mixers, Farrell continuous mixers and the like. The nucleating agent can also be added during the sheet extrusion process.

Plasticizers also tend to improve the rate at which PLA crystallizes. In general, a suitable plasticizer is one that is compatible with the PLA resin and stable under the conditions of the heating and thermoforming steps. Suitable plasticizers include phthalates (including dioctyl phthalate), citric acid esters, lactic acid esters such as ethyl lactate, lactide esters, mineral oil, triphenyl phosphate, glycerine, acetin and butyrin. Those that are biodegradable are preferred. Suitable amounts of plasticizer are from about 0.5 to about 30 percent, based on the combined weight of the PLA resin plus the plasticizer. Plasticizers are conveniently melt compounded into the PLA resin or added during the sheet extrusion process as described before.

The ability of a PLA resin to crystallize at a given temperature can be expressed in terms of a crystallization half-time, as described more fully by Kolstad in "Crystallization Kinetics of Poly(L-lactide-co-meso-lactide)", *J. Appl. Poly. Sci.* 62:1079-1091 (1986), incorporated herein by reference. In general the crystallization half-time is the time required for a PLA resin to achieve one-half of its ultimate extent of crystallization under particular heating conditions. Sheets of PLA resins exhibiting crystallization half-times of less than 10 minutes, preferably less than 3 minutes, and especially less than 1 minute at the temperatures of the heating step are suitable. Sheets of PLA resins that exhibit crystallization half-times of less than about 10 seconds may crystallize too rapidly to provide good process control.

The sheet may be a multilayer type, in which at least one layer is a crystallizable PLA resin as described. Other layers may also be of crystallizable PLA resin, an amorphous PLA resin, or may be composed of a different polymer (such as a barrier plastic), provided that the sheet can be thermoformed under the conditions described herein. Multilayer sheets may be formed by, for example, coextrusion or lamination.

The sheet may also be cellular. Cellular sheet can be made by incorporating a foaming agent into the PLA resin during the sheet extrusion process, and extruding the sheet under conditions such that the foam agent generates a gas and expands the sheet when the sheet is extruded. Extrusion foaming processes are well known and applicable here. Cellular sheet is preferably mainly closed celled and has a density as low as about one $lb/ft^3$.

A cellular sheet can be formed by foaming it during the softening/crystallization step of this process. In this case, the sheet will contain a foaming agent that generates a gas under the conditions of the heating step. In this manner, the sheet can be simultaneously heated and blown. Suitable blowing agents include lower hydrocarbons, halogenated alkanes such as fluorinated alkanes and perfluorinated alkanes, and water, as well as chemical blowing agents such as citric acid/sodium bicarbonate mixtures, gasses such as carbon dioxide and nitrogen, and the like.

Formed articles made according to the invention have improved resistance to heat, compared to PLA articles that are formed with lower crystallinity. Formed PLA articles having a crystallinity of about 15 Joules/gram or more have been found to withstand boiling water for several minutes without significant dimensional changes or distortion. As such, the formed articles can be used as containers for hot foods, as microwavable food trays, or in other applications where they are exposed to moderately high temperatures (up to about 100° C. in many cases, and up to the crystalline melting point of the article for more highly crystalline articles). As PLA resin is hydrolyzable, the length of time for which the article can withstand elevated temperatures will depend on whether, and how much, water is present. In general, the presence of liquid water or increasing humidity tends to shorten this time, as the PLA tends to hydrolyze under those conditions.

The formed articles tend to be opaque to somewhat translucent in appearance, even when a nucleating agent is used. The degree of opacity is generally related to the number and size of the spherulitic crystallites developed in the crystallization step. The opacity can be reduced through more effective crystal nucleation. More effect nucleation is favored by using smaller nucleating particles, in larger numbers. In some instances, the PLA resin may become oriented during the forming process. This may cause some reduction in opacity in the areas in which the orientation occurs.

Among the articles that can be made according to the invention are: beverage cups, other foodware such as trays and plates, including those having attached lids; trays and plates for non-food applications and separate lids or covers for any of the foregoing.

The following examples are provided to illustrate the invention, but are not intended to limit its scope. All parts and percentages are by weight unless otherwise indicated.

Example 1

A. Evaluation of Processing Window for Talc-Nucleated PLA Sheet

A single-stage, shuttle-type lab-scale thermoformer without plug assist and a heating oven equipped with an IR radiant heater positioned above and below the sheet is used to evaluate the processing conditions for a nucleated PLA resin sheet. 20-mil sheets made from an amorphous, random copolymer of 98.3% L-lactic acid and 1.7% D-lactic acid and containing 10% by weight Ultratalc™ 609 (trademark of Specialty Minerals, Inc.) talc are placed for varying, predetermined times in the pre-heated thermoformer oven with the heaters set at 80% power. After the predetermined time in the oven, the sheets are racked out and their surface temperature measured using a Raytek™ ST IR surface thermometer. The sheets are then cooled by forcing cool air over their surface. The crystallinity of the cooled sheets is measured by DSC according to the procedure below. In this manner, induced crystallinity is correlated both to oven residence time and to the attained surface temperature, as follows:

TABLE 1

| Time in Oven (s) | Attained Surface Temperature (° C.) | Crystallinity (J/g) |
|---|---|---|
| 16 | 111 | 22.1 |
| 20 | 128 | 30.1 |
| 25 | 143 | 31.7 |
| 30 | 151 | 36.4 |
| 40 | 162 | 5.8 |
| 55 | 182 | 6.5 |

The DSC measurements are made using a Mettler Toledo DSC 821e calorimeter running Star V. 6.0 software. Samples are 5-10 milligrams. Heating is performed from 25-225° C. at 20° C./minute, under air.

At a heating time of less than 16 seconds under these conditions, the sheet is too rigid to form, even though the measured crystallinity was less than 22 J/g. At 40-55 seconds residence time, the PLA sheet contains less than 10 Joules/g crystallinity, indicating that the sheet has reached too high a temperature, thereby destroying the crystallinity. At more than 55 seconds residence time, the sheet is too fluid to form. Within the range of 16 to 30 seconds heating time, the sheet becomes thermoformable and attains the desired crystallinity.

Similar evaluations of 20 mil sheets of other PLA resins demonstrate how the process window can vary with the composition of the PLA resin. When a PLA resin containing 1.7% D-isomer and 2.5% Ultratalc 609 is tested, the optimum oven residence time under these conditions is about 18-33 seconds. The attained surface temperature that correlates to 15 J/g or more crystallinity is about 115-155° C. For a 1.2% D-isomer PLA containing 5% UltraTalc 609, the optimum oven residence time under these conditions is about 10-23 seconds and the surface temperature correlating to 15 J/g or more crystallinity is 105-155° C.

B. Thermoforming of PLA Resin Sheet on Cold Mold

Sheets of amorphous PLA resin as described in A above are thermoformed by heating them in the pre-heated thermoformer oven for 15 seconds at 90% power, and then immediately vacuum forming the heated sheets onto a 23° C., single compartment tray mold having dimensions of 3⅛×3⅝×1.5 inches. The time on the mold is varied in order to determine the minimum cycle time and to assess the effect of in-mold residence time on crystallinity. All parts come off the mold rigid, regardless of in-mold residence time. The results are summarized in Table 2 below.

TABLE 2

| Time on Mold (s) | Overall Cycle Time (s)* | Crystallinity (J/g) |
|---|---|---|
| 4 | 19 | 16.7 |
| 3 | 18 | 16.1 |
| 2 | 17 | 16.4 |

*Includes 15 seconds residence time in thermoformer oven.

The data in table 2 demonstrate that thermoformed articles of semi-crystalline PLA are easily prepared via the process of the invention. Note that under these conditions, the in-mold residence time has no effect on crystallinity, indicating that all crystallinity is developed in the thermoformer oven during the heating step. This is confirmed by DSC evaluation of a sheet that is taken from the thermoformer oven and rapidly cooled without undergoing the forming step.

C. Heat Stability of Formed Parts

The heat resistance of the parts made in B above is evaluated by filling the part with water and microwaving at high power for five minutes, or longer if required to bring the water to boiling. All parts retain their shape under this test. By contrast, a similar part having a crystallinity of less than 10 J/g nearly completely loses its shape under this test, flattening almost entirely so that the water it contains at the start of the test is completely spilled.

Example 2

A 98.8% L/1.2% D PLA resin containing 5% Ultratalc 609 is used in this Example. It is extruded into 16" wide, 20 mil sheet using a single screw extruder equipped with a general purpose screw, a Maddock mixing head and a 28" horizontal cast sheet die. The freshly extruded, substantially amorphous sheet is run through a heated three roll stack, trimmed and wound into rolls.

This sheet is thermoformed on an Irwin Mini Mag 28 in-line thermoformer equipped with a 6" soup bowl mold. The machine is operated at 14' and 24" index lengths. Index length affects oven residence time, with larger indices reducing residence time proportionately, for a given cycle time. The oven is operated at a top oven temperature of between 480 and 675° F. and a bottom oven temperature of between 430 and 635° F., as indicated in Table 3 below. The temperature of the sheet is measured as it leaves the oven just prior to forming, using an IR thermometer. The mold temperature is about 23° C. In-mold residence time is less than 3 seconds. Samples of the sheet trim and the molded bowls are taken in order to measure crystallinity. It is found that the crystallinity of the sheet trim that is not quenched by the mold is not significantly different from that of the corresponding bowls. This confirms that crystallization has occurred in the heating step prior to forming. Results are summarized in Table 3.

TABLE 3

| Index Length (in.) | Top Oven Temp. (° C.) | Bottom Oven Temp. (° C.) | Attained Sheet Temp. (° C.) | Crystallinity (Molded Parts) (J/g) |
|---|---|---|---|---|
| 14 | 480 | 430 | 120 | 16.3 |
| 14 | 490 | 445 | 133 | 16.5 |
| 14 | 500 | 450 | ND | 21.6 |
| 14 | 505 | 460 | 140 | 25.7 |
| 14 | 510 | 465 | 143 | 26.5 |
| 14 | 520 | 475 | 143 | 25.1 |
| 14 | 530 | 485 | 149 | 25.9 |
| 24 | 635 | 585 | 137 | 16.6 |
| 24 | 650 | 610 | 146 | 18.3 |
| 24 | 675 | 635 | 155 | 14.0 |

What is claimed is:

1. A method for making formed heat-resistant PLA articles, comprising softening and crystallizing a sheet of an amorphous, crystallizable PLA resin by heating the sheet until it has obtained a surface temperature from about 80 to about 155° C., adjusting the temperature of a male or female mold to a temperature below 80° C. and below the $T_g$ of the PLA resin, then positioning the softened and crystallized sheet over the mold and vacuum drawing the softened and crystallized sheet on the mold.

2. The method of claim 1, wherein the sheet is heated under conditions such that the PLA resin attains a crystallinity of at least 15 Joules/gram.

3. The method of claim 2, wherein the PLA resin is a homopolymer of L-lactic acid or D-lactic acid, a random copolymer of L-lactic acid and D-lactic acid, a block copolymer of L-lactic acid and D-lactic acid or a mixture of two or more of these.

4. The method of claim 3 wherein the PLA resin contains a nucleating agent, a plasticizer, or both.

5. The method of claim 4 wherein the PLA resin contains from about 1 to about 40 percent of a finely divided talc, based on the combined weight of the PLA resin and the talc.

6. The method of claim 3 wherein the PLA resin has a crystallization half-time at the temperature to which it is heated during the heating step of less than 3 minutes.

7. The method of claim 6 wherein the sheet is heated under conditions such that the PLA resin attains a crystallinity of at least 20 Joules/gram.

8. The method of claim 7 wherein the sheet is heated under conditions such that the PLA resin attains a crystallinity of at least 24 Joules/gram.

9. The method of claim 1 wherein the PLA sheet contains one or more additives selected from the group consisting of nucleants, other inorganic fillers, plasticizers, reinforcing agents, slip agents, lubricants, UV-stabilizers, thermal stabilizers, flame retardants, foaming agents, antistatic agents, antioxidants and colorants.

10. The method of claim 1 wherein the amorphous PLA sheet is cellular.

11. The method of claim 1 wherein the amorphous PLA sheet contains a foaming agent, and expands during the heating step to become cellular.

12. The method of claim 1 wherein the PLA resin contains a plasticizer.

13. The method of claim 1 wherein the sheet of amorphous PLA resin forms a layer of a multilayer structure having at least one other layer which is not a crystallizable PLA resin.

14. A thermoformed article made according to the process of claim 1.

15. A method for making formed heat-resistant PLA articles, comprising softening a sheet of a semicrystalline PLA resin having a crystallinity of at least 10 Joules/gram by heating the sheet to a temperature at which the sheet can be thermoformed but at which the crystallinity of the sheet is not reduced below 10 Joules/gram, adjusting the temperature of a male or female mold to a temperature below 80° C. and below the $T_g$ of the PLA resin, and then positioning the softened sheet over the mold and vacuum drawing the softened sheet on the mold to produce a formed article of PLA resin having a crystallinity of at least 10 Joules/gram.

16. A method for making formed heat-resistant PLA articles, comprising heating softening and crystallizing a sheet of an amorphous, crystallizable PLA resin by heating the sheet to a temperature at which the PLA resin forms crystallites and for a time sufficient to impart a crystallinity of at least 10 Joules/gram to the PLA resin, adjusting the temperature of a male or female mold to a temperature below 80° C. and below the $T_g$ of the PLA resin, then positioning the softened and crystallized sheet over the mold and then vacuum drawing the softened sheet on the mold to produce a formed article of PLA resin with a crystallinity of at least 10 Joules/gram.

17. The method of claim 1 wherein the surface temperature of the heated sheet is below the melting temperature of the PLA resin.

18. The method of claim 17 wherein the mold temperature is adjusted to no greater than 50° C.

19. The method of claim 18 wherein the mold temperature is adjusted to no greater than 35° C.

20. The method of claim 1 wherein the sheet of amorphous PLA resin forms a layer of a multilayer structure containing at least one other layer.

21. The method of claim 20 wherein the at least one other layer of the multilayer structure is a layer of a crystallizable PLA resin.

22. The method of claim 21 wherein the sheet of amorphous PLA resin contains a nucleating agent.

* * * * *